March 4, 1930. A. M. RASMUSEN 1,749,302
NOZZLE SUPPORT FOR GARDEN HOSE
Filed Jan. 21, 1929
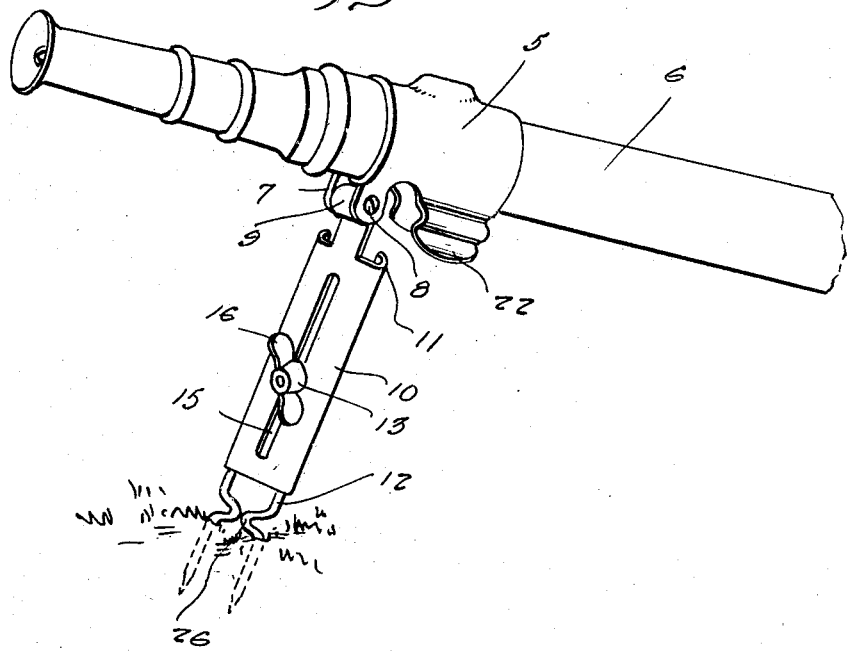
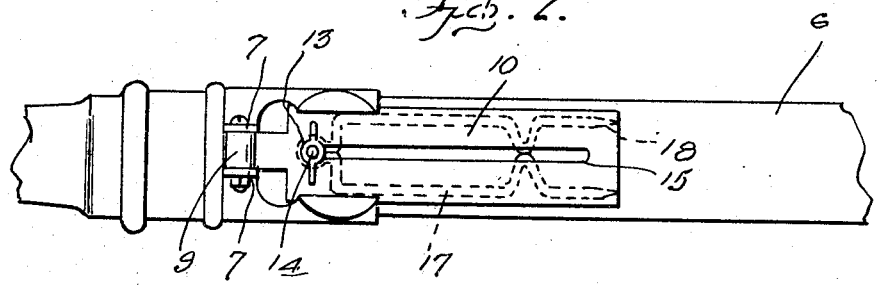
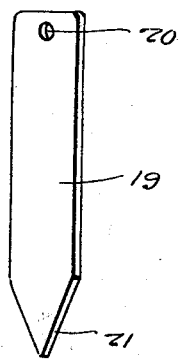
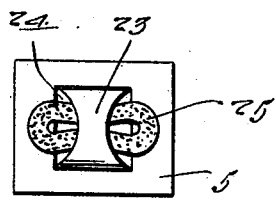
Inventor
A. M. Rasmusen
By Clarence A. O'Brien
Attorney Patented Mar. 4, 1930

1,749,302

UNITED STATES PATENT OFFICE

ANDREW M. RASMUSEN, OF MONTROSE, COLORADO

NOZZLE SUPPORT FOR GARDEN HOSE

Application filed January 21, 1929. Serial No. 333,860.

The present invention relates to nozzle supports or holders for garden hose, and has for its principal object to provide a device of this character by means of which the nozzle of the hose may be supported in any desired position.

A further object of the invention is to provide a device of this character embodying an adjustable leg for securing the nozzle in an adjusted elevated position, and pivotally attaching the leg to a clamp fitted about the hose and arranging a spring clip for retaining the leg in folded condition against the hose when the support is not in use.

A still further object of the invention is to provide an attachment of this character of a simple and practical structure, which may be easily and quickly secured in supporting position upon the hose, which is relatively inexpensive to manufacture and otherwise well adapted to the purpose for which it is intended.

Other objects and advantages of the invention will become apparent from the following description when taken in connection with the accompanying drawing.

In the accompanying drawing wherein like reference characters indicate corresponding parts throughout the same:

Figure 1 is a perspective view showing the device in nozzle supporting position.

Figure 2 is a bottom plan view showing the same in folded position.

Figure 3 is a top plan view showing the holder provided in the clamp member for carrying an extra hose gasket.

Figure 4 is a perspective view of a modified form of telescoping leg for the device.

Referring now to the drawing in detail, wherein for the purpose of illustration I have disclosed a preferred embodiment of my invention, the numeral 5 designates a hose clamp, which is preferably constructed of spring pressed material, and of cylindrical formation to fit about the hose 6, said clamp being split longitudinally and formed at its split edges with a pair of spaced parallel lugs 7. A tightening screw 8 is threaded in openings formed in the lugs 7 whereby to draw the split sections of the clamp tightly about the hose. The pin 8 also forms a pivotal mounting for the rolled end 9 of a sectional leg 10, said leg being preferably constructed of sheet material having its edges 11 turned inwardly to form a pair of guide flanges for a telescoping leg section 12. This telescoping leg section 12 may be constructed either of wire as illustrated in Figures 1 and 2 of the drawing with its intermediate section formed into an eye 13 for attaching a bolt 14 to the leg section which is inserted through a longitudinally extending slotted opening 15 formed in the leg section 10. A wing nut 16 is threaded on the end of the bolt for securing the sections of the leg in longitudinal adjusted position. The ends of the wire are bent in spaced parallel relation as indicated at 17 and pointed as shown at 18 to facilitate the embedding of the ends of the leg section into the ground.

The telescoping leg section may also be formed of sheet material as shown at 19 with an opening 20 formed at its inner end for receiving the bolt 14, and its outer end tapered as illustrated at 21 for embedding the leg section in the ground. The split edges of the clamp 5 are also formed into a pair of spring strips 22 disposed in spaced relation and providing a restricted opening for receiving the leg and retaining the same in folded position against the hose when not in use. The side of the clamp opposite from its split portion a gasket holder 23 which is formed by punching a section of the material of the clamp outwardly and cutting openings 24 therein at opposite sides whereby to permit the insertion of an extra hose gasket 25 between the punched out portion 23 and the body of the clamp.

When the wire legs 12 are used with the support, a section of the parallel sides 17 thereof are bent inwardly toward each other as shown at 26 whereby to projections in each of the legs to limit the extent of movement of the ends thereof into the ground. It will be apparent from the foregoing that the support constructed in accordance with my invention will serve to support the nozzle of the hose in a desired elevated position above the ground, and when not in use may be folded against the hose in an out of the way position.

It is obvious that my invention is susceptible to various changes and modifications in construction without departing from the spirit of the invention or the scope of the appended claim, and I accordingly claim all such forms of the device to which I am entitled.

Having thus described the invention, what I claim as new and desire to secure by Letters Patent is:

A hose support of the character described comprising a longitudinally split clamp disposed about the hose with a portion of its split edges formed into a pair of spaced lugs, a retaining pin extending beneath said lugs for securing the same to each other, an adjustable leg composed of a pair of telescoping sections, one of said sections having its end bent about said pin and pivotally supported thereon, and with its longitudinal edges bent inwardly at one side to form guides for the other of said leg sections, said pivoted leg section also having a longitudinally extending slotted opening formed therein and said other leg section having a bolt extending therefrom for insertion in said opening and adapted for threadedly receiving a nut whereby to secure the leg sections in longitudinally adjusted position, a pair of opposed spring clips also formed on the split edges of the clamp and adapted for engaging said leg whereby to retain the same in folded position against the hose.

In testimony whereof I affix my signature.

ANDREW M. RASMUSEN.